United States Patent [19]

Colyer

[11] Patent Number: 5,903,725
[45] Date of Patent: May 11, 1999

[54] RECOVERABLE PROXY OBJECT IN AN OBJECT ORIENTED ENVIRONMENT

[75] Inventor: Adrian Mark Colyer, Bitterne, United Kingdom

[73] Assignee: International Business Machines Corporation, Armonk, N.Y.

[21] Appl. No.: 08/709,084

[22] Filed: Sep. 6, 1996

[30] Foreign Application Priority Data

Sep. 15, 1995 [GB] United Kingdom ............. 9518951

[51] Int. Cl.⁶ .................................................. G06F 15/163
[52] U.S. Cl. ................. 395/200.33; 395/683; 707/103
[58] Field of Search .......................... 395/683, 200.69, 395/200.33, 684; 707/103

[56] References Cited

U.S. PATENT DOCUMENTS

| 5,613,148 | 3/1997 | Bezviner et al. | 395/800 |
| 5,692,183 | 11/1997 | Hapner et al. | 395/614 |
| 5,724,588 | 3/1998 | Hill et al. | 395/684 |
| 5,732,270 | 3/1998 | Foody et al. | 395/683 |

FOREIGN PATENT DOCUMENTS

WO-94/11810
-A1  5/1994  WIPO.

OTHER PUBLICATIONS

S Menon, R J LeBlanc Jr, "Object Replacement using Dynamic Proxy Updates", Proceedings of the Second International Workshop on configurable distributed systems (1994), pp. 82–91.

S Maffeis, "A Flexible System Design to Support Object–Groups and Object–Oriented Distributed Programming", Object based distributed programming ECOOP '93 Workshop proceedings, 1994, pp. 213–224.

A Dave, M Sefika, R Campbell, "Proxies, Application Interfaces, and Distributed Systems", "Proceedings of the Second International Workshop on Object Orientation in Operating Systems", 1992, pp. 212–220.

A. Dave et al, "Proxies, Application Interfaces, and Distributed Systems", "Proceedings of the Second International Workshop on Object Orientation in Operating Systems," 1992, pp. 212–220, 1992.

*Primary Examiner*—Stuart S. Levy
*Assistant Examiner*—Tod Kupstas
*Attorney, Agent, or Firm*—Jeffrey S. LaBaw

[57] ABSTRACT

A mechanism is described for protecting a server against invalid usage of proxy objects after malfunction of a server and also for transparently re-creating proxy objects in a client of a client-server distributed processing system. A proxy class is used that has additional attributes indicating the name of the target object in the server, an indication as to whether the name is presently valid and an alternate pointer to the target object. A proxy register object in the client maintains pointers to all the proxy objects which point to objects in the server. On malfunction of the server, and consequent invalidity of the proxy objects, the proxy register object causes all proxy objects to be refreshed.

16 Claims, 6 Drawing Sheets

RECOVERABLE PROXY OBJECT IN AN OBJECT ORIENTED ENVIRONMENT

TECHNICAL FIELD

The present invention relates to computerised object-oriented technology and, more particularly, to a proxy object for use in such technology, the proxy object being located in a client representing a target object located in a server, wherein the proxy object is recoverable after a failure of the server.

BACKGROUND OF THE INVENTION

Overview of Object-Oriented Programming

Prior to the development of object-oriented programming, a form of programming was developed known as structured programming, which is still used extensively. In this technique, various functions are first defined, and the program then consists of calling such defined functions at appropriate times to effect the overall objective of the application program. Such functions define the methods that are used to operate on the data, but do not define the data itself. Structured programming provided the opportunity of a modularised approach—a significant improvement over "spaghetti code" which was difficult to debug and maintain. Nevertheless, several drawbacks to structured programming remain, such as the "semantic gap" between the concepts and entities in the world being modelled by the program and the concepts in the programming language, the textual nature of the program code, and limitations on reusability of code modules.

Subsequently, a new programming paradigm was developed, referred to as object-oriented programming. In this technique, instead of defining functions, "classes" are defined. The class definitions define the methods which any instance of that class can perform and the attributes (or data) that an instance of that class contains. An object is a member of a class and can actually perform the methods, which are defined in the class definition. An object has values associated with each of the attributes defined by the class. An object has zero or more attributes and it has zero or more methods that can be performed on the object.

The interface to the object is the way in which the attributes can be accessed through the methods. All objects derived from that class share the interface of that class. The implementation of an object is hidden from the application which calls the object. As long as the interface to the object does not change, the implementation may be completely altered without affecting the application.

As a simplistic example of this technique of describing the external "appearance" of an object without the necessity of describing what it "looks like" or "does" inside, and in order to illustrate the significant benefits of such object-oriented programming, one might imagine, by analogy, a common household toaster, which could be modeled by the object-oriented approach. The external "interface" would consist of the knob, which essentially represents a parameter for adjusting the desired lightness or darkness of the toast, the slot into which the bread is inserted, and a lever for effecting the insertion and activating the toaster. The important concept is that the end-user of such an appliance does not need to know the "internals" of the toaster in order to use it, e.g. whether heat is provided by electricity, or by chemical or other means. All the user would have to do is interface properly with these externals.

The beauty of this evolution in programming is that, continuing with the analogy, the designer of the object, which might be a module of programming code modelling a toaster, may focus on improving the internals of the toaster, making it more efficient, for example, without affecting the user's ability to use the object, in as much as the internals are transparent to the user. Thus, more abstractly, object-oriented technology may be seen essentially as providing the advantage of separation of the interface of an object from its implementation. In a software context, the internals of the object may thereby be rewritten and improved without the necessity of rewriting the entire application program, as long as the external "knobs" etc, and their expected behaviour have not changed.

For further general background regarding object technology to facilitate a better understanding of the invention, reference should be made to "Object Oriented Technology—A Manager's Guide", by David A. Taylor, copyright 1990, Servio Corporation.

With the development of object-oriented programming, several "object models" were further refined and developed by various organisations and software companies. These specified the manner in which one was to define objects and their external interfaces, such various object models providing characteristics of encapsulation and inheritance among others. At an appropriately high level, these various object models are very similar. Examples are the System Object Model (SOM), Common Lisp Object System (CLOS), Smalltalk, and C++. In essence, these various object models are simply a body of rules answering the question of what an object is, each offering slightly different answers when examined at lower levels. For example, various object models differ in their language syntax, and in how encapsulation and inheritance work.

As a direct result of these differences, one problem presented by the availability of different object-oriented languages and object models was that interoperability between object programs written in a mixture of such languages could not be achieved. This problem adversely impacted one of the major promises of object technology, namely reusability of code. In an effort to address this problem plaguing the industry, a Common Object Request Broker Architecture (CORBA) was arrived at by committee, which included a standardized Interface Definition Language (IDL). There was in essence an agreement in the industry as to how interfaces of an object would be specified, i.e. a standard for defining object interfaces so that objects defined by one vendor could be utilized by another. See "The Common Object Request Broker:Architecture and Specification", OMG Document Number 91.12.1 Revision 1.1.

Object Request Broker (ORB)

The Object Request Broker (ORB) described in the CORBA architecture is analogous to the Remote Procedure Call (RPC) familiar to those working in the UNIX operating system environments (UNIX is a trademark exclusively licensed through X/Open Co. Ltd).

Figure 1:
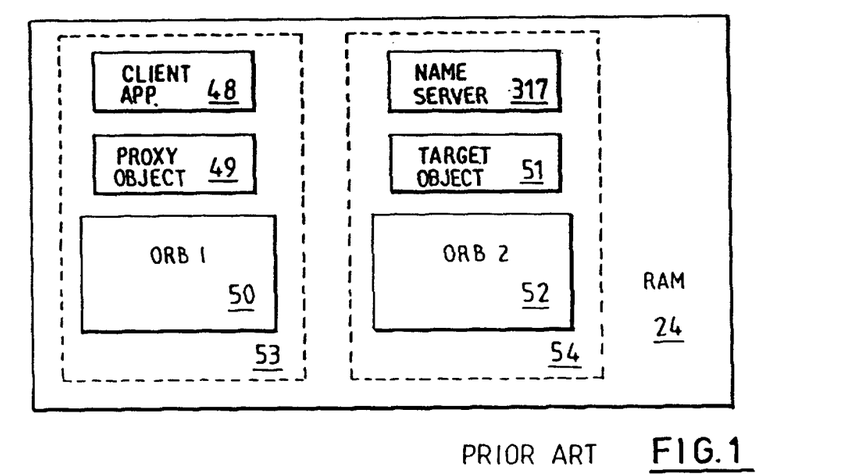
FIG. 1 is a block diagram of a prior art Object Request Broker located in a client/server environment.

FIG. 1 shows a client/server environment including an ORB. The ORB is split into two parts, part 50 of which executes in each of the clients using the ORB and part 52 of which executes in each of the servers supporting the ORB. Like an RPC, an ORB is a mechanism which allows client applications 48 working in one address space 53 to communicate with objects 51 in another address space 54. Objects 51 located in the other address space 54, that is not the same address space 53 as that in which the client application 48 is executing, are referred to as "remote" objects. Objects located in the same address space 53 as the client application 48 are referred to as "local" objects. An ORB 50 intercepts a call from a client application 48 in one address space 53, encapsulates it into a network protocol, decodes the call for the target object 51 in another address space 54 and returns the results back to the calling client application 48. This allows a client application 48 working in one address space (local) to communicate with objects 51 in another address space (remote). ORB is an improvement upon the RPC as it is designed to provide the higher level of flexibility and power offered by object oriented programming.

"Object models" have been developed by various organisations and software companies. The object models specify the manner in which objects and their external interfaces are to be defined. One of these object models is System Object Model (SOM) from IBM Corporation. In SOM, all applications using objects run in a single address space in which the objects are also located. A development within SOM is a framework of object classes called Distributed System Object Model (DSOM). In DSOM, applications (running in clients) in one address space may access objects in another address space (such as an address space belonging to a server). These address spaces may be in the same or different systems. In fact, the systems need not be running the same platform. For example, a client application running in an address space on an OS/2 system may access an object that is located in an address space on an AIX/6000 system, or vice versa. Both SOM and DSOM are described in "SOMobjects: A Practical Introduction to SOM and DSOM", published by IBM Corporation, Copyright 1994, Order no. GG24-4357-00.

The aforementioned System Object Model (SOM) is one object model which conforms to CORBA and IDL. Conformance means that SOM objects follow CORBA semantics, and SOM objects are defined in IDL syntax.

The DSOM framework provides object implementations that insulate the client programmer from having to have knowledge of the location or platform type where a target object will be instantiated. The communications facilities used for this inter-process communication are completely hidden from the programmer.

Client-Server Architecture

In a client-server architecture, application programs are divided into distinct tasks that execute as individual components. Each of the components are assigned roles as clients or as servers. A single component may perform the role of a server for some purposes and of a client for other purposes. Each of the components operates independently and assumes certain responsibilities. Those components which are assigned the role of client request services from a server by making method calls on an object in a server process. Those components which are assigned the role of server provide services by receiving these method calls, invoking them on the appropriate object and returning the results to the client. The clients and servers exchange messages using a predefined protocol. Servers can service many clients and clients can draw upon the services of many servers.

Proxy Objects

A proxy object is an object that is a local representative for a remote target object. A proxy object inherits the target object's interface, so that it responds to the same methods. Methods invoked on the proxy object are not executed locally, but are forwarded to the real target object for execution. A program running in a client always has a local proxy object, in the client, for each remote object, in a server, on which it operates. The proxy object contains, within it, a pointer to the memory location in the server where the target object is located. It does not contain the name of the target object. The proxy object is created by the DSOM run-time environment whenever a request is made to a remote server to invoke a method on a remote object.

DSOM Environment

Figure 2:
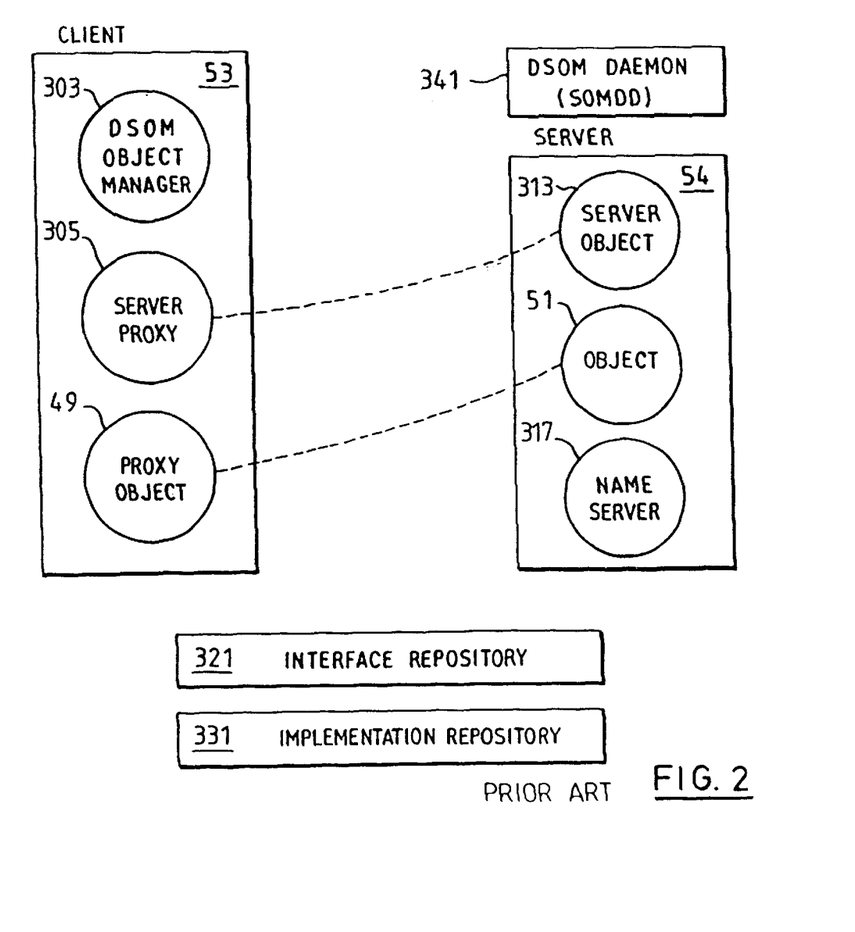
FIG. 2 is a block diagram of a prior art DSOM environment.

Client processes make method calls on objects in a server process. These method calls may, for example, get the value associated with an attribute (read) or set the value associated with an attribute (write). The server process will receive these method calls, invoke them on the appropriate object and return the results to the client. FIG. 2 provides a very high-level view of some of the components of a DSOM environment. The client address space 53 includes an object called the DSOM Object Manager 303. This object assists the client application (48 in FIG. 1) with locating servers 54 by returning a pointer to a proxy object 305 (described below) for the server object 313. The client then invokes methods on the server object 313 (via its proxy object 305) in order to create instances of objects 51 of predefined classes on that server 54, to gain access to objects 51 that already exist on that server or to destroy objects 51 on that server 54 when they are no longer needed.

The client application (48 in FIG. 1) makes calls to the server proxy object 305 to find out the location of an object 51 on which it wishes to make a method call. The server proxy object 305 calls the server object 313 to determine the memory location of the target object 51 in the server. The server object obtains this information from a name server 317, whose function is to provide a memory location given an object name. Its function will be familiar to those working in the UNIX operating system environment. The server object 313 provides the memory location of the target object 51 to the server proxy object 305. A proxy object 49 for the target object 51 is then created in the client address space 53. The local client application can then make method calls on the local proxy object 49 as if it were the remote target object 51. DSOM will pass the method call to the server address space 54 where the method call is invoked on the target object 51 and the results will be returned to the local client application.

On any system that will act as a server, or as a client, or as both, a separate daemon process 341 called "somdd" must be active. This process is instrumental in initializing server processes, providing services that must be available at all times and in creating a binding between the client process and the server process. The term "daemon process" and its function will be familiar to those working in the UNIX operating system environment. It plays no further part in the present invention.

There are two additional facilities that are required in a DSOM environment. These are the Interface Repository 321 and the Implementation Repository 331.

The Interface Repository 321 is a database for storing object interface definitions. Class interface definitions (a method's parameters and return value) are registered with the Interface Repository. The Interface Repository plays no part in the present invention. Server implementations and the classes they support are registered in the Implementation Repository. That is, servers and classes and the attributes necessary for DSOM to find and activate an object server (such as the server program name, hostname of the machine where the server is located, and so on) are registered in the Implementation Repository.

Persistence

A persistent object is one in which the attributes associated with the object are stored in non-volatile storage and are available even after the process that created it has terminated. An object which is not persistent does not have the attributes associated with the object stored in non-volatile storage and the attributes of the object are not available after the process that created it has terminated. If a server crashes, then non-persistent objects will not be restored, while persistent objects will be restored, if the server is a recoverable server so that it restarts after a malfunction occurs.

Server malfunction

Referring to FIG. 2, if the server 54 malfunctions, the reference in the proxy object 49 located in the client address space 53 to a target object 51 located in the server address space 54 will no longer be valid. The server 54 will reload the object into memory so as to make it available to the client application (48 in FIG. 1). The server 54 may reload the object 51 into memory at a different location to where it was prior to the malfunction. If the object 51 had been loaded specifically at the request of the client application (48 in FIG. 1), that is, it is not a persistent object, then the server 54 may not even reload the object 51 into memory at all. In both of these situations, the reference contained within the proxy object 49 to the target object 51 in the server 54 will no longer be valid. Use of the proxy object 49 will result in an error condition indicating that the object referenced is a bad object or similar. In some Object Request Broker implementations this can have serious effects, such as corruption of memory in the server or even malfunction of the server requiring a further restart of the server.

When the client application 48 receives an error condition indicating that one of more of its proxy objects 49 have become invalid, it will need to perform one of the following steps:

A. If the target object 51 was not persistent, the client application 48 will need to create a new target object 51 in the server 54. The client application 48 calls a server proxy object 305 to request that a new target object 51 be created giving the class of object to be created. The server proxy object 305 calls the server object 313 to determine the memory location of the target object 51 in the server 54. The server object 313 provides the memory location of the target object 51 to the server proxy object 305. A proxy object 49 for the target object 51 is then created in the client address space 53. The proxy object 49 includes a reference to the location in memory in the server 54 where the target object 51 can be found.

B. If the target object was persistent, then the client application 48 will need to create a new proxy object 49 including a reference to the location in memory in the server 54 where the target object 51 can be found.

If a server 54 has malfunctioned, then it is likely that all references from proxy objects 49 located in the client address space 53 to all of the target objects 51 located in that server 54 will need to be refreshed by carrying out the steps listed above. This is a non-trivial exercise for a typical client application 48. The client application 48 has pointers to proxy objects 49 located at various places throughout its address space and needs to perform the following tasks:

1. It needs to destroy the old proxy objects 49 which now contain references to memory locations in the server 54 which were valid references to target objects 51 before the server 54 malfunctioned, but which are now invalid.

2. It needs to create new proxy objects 49 corresponding to each of the old proxy objects. These new proxy objects 49 correspond to the old ones, except that the references they contain to target objects 51 in the server 54 are valid references, obtained since the server 54 restarted after the malfunction.

3. All of the pointers in the client application to the proxy objects 49 located in the client address space 53, which were destroyed at step 1, now need to be updated to point to the new corresponding proxy objects 49 created at step 2. This step requires knowledge specific to the application that needs to have its pointers updated.

If a server malfunctions, the references in the proxy object located in the client to the target objects located in the server will no longer be valid. The Object Request Broker will generate a TIMEOUT error when the client tries to use the invalid reference, since the remote server no longer exists.

Preventing Invalid Proxy Object Usage

Every server implemented using the DSOM framework has a server object, to which all incoming messages are directed. This object dispatches the messages to their true destination, which will be another object in the same DSOM server. A method of preventing invalid proxy object usage is for the DSOM server to do some basic checking of a timestamp associated with the proxy object and with a timestamp associated with the DSOM server itself and return an error condition if the timestamp associated with the DSOM server is later than that associated with the proxy object. Similar checks may be performed in systems utilising other Object Request Brokers.

These checks detect that an error has occurred and that the reference contained within a proxy object is invalid, but they provide no way in which the error can be corrected. The references may be corrected using application specific knowledge and code to correct the references in the proxy objects located in the client applications. "Object replacement using dynamic proxy updates", S Menon, R J LeBlanc Jr, Dist. Syst. Engng 1 (1994) pp.271–279, discloses an object replacement scheme in which, on receiving an error indicating that a proxy object reference to a target object is invalid, the proxy object requests an updated reference from a Name Server. Low level events are used to detect errors and update proxy objects. The object replacement scheme is specifically for use with the Clouds distributed operating system. The scheme described does not work with other operating systems or with Object Request Brokers in general.

SUMMARY OF THE INVENTION

Accordingly the invention provides a method of distributed object-oriented computing in which a recoverable proxy object, located in a client address space has a pointer to a target object in a server address space, the method being characterised by the steps of storing, in said proxy object, the name of the target object, an indication as to the validity of the proxy object and an alternate proxy to said target object; said proxy object registering itself with a proxy register object, said proxy register object maintaining a referencing pointer to said proxy object; said proxy object checking the validity of the proxy object, prior to each invocation of said target object; responsive to said checking, using the proxy object if valid, or the alternate proxy if not valid; and responsive to a malfunction in said server address space: said proxy register object causing each of said proxy objects to obtain a valid alternate proxy to target objects in said server, to indicate that said proxy object is invalid and to store a pointer to the valid alternate proxy.

In a first embodiment, the server address space and the client address space are linked by a bi-directional communications link, and the server object requests the client application to cause each of the proxy objects to refresh by obtaining a valid alternate proxy to target objects located in the server address space.

In a second embodiment, the client application causes each of the proxy objects to refresh by obtaining a valid alternate proxy to target objects located in the server address space on receipt of an error indication in accessing a target object located in the server address space.

Preferably, the distributed object-oriented system is a CORBA compliant system and the distributed object-oriented computer system uses DSOM class libraries. However, the invention is not limited to application in such systems or using such class libraries. For example, the distributed object-oriented system could conform to Microsoft's Component Object Model (COM), or it could use class libraries from Distributed Object Management Facility (DOMF) available from SunSoft as Distributed Object Environment (DOE) and from Hewlett Packard Co. as ORB Plus.

The invention also provides a method of distributed object-oriented computing in which proxy objects in a client address space have a primary pointer to target objects in a server address space so that calls on the proxy object result in invocation of the corresponding target objects, the method comprising the steps of: in response to a malfunction in the server address space potentially causing relocation of said target objects; recovering said proxy objects to point to the relocated target objects; the method being characterised by the further steps of: causing each of said proxy objects to obtain from a name server in said address space and to store a valid alternate pointer to said relocated target objects; creating a validity flag in said proxy object indicating that said primary pointer is invalid and said alternate pointer should be used whereby a call on the proxy object will result in invocation of the relevant target object.

In a preferred embodiment in which the distributed object-oriented computer system uses DSOM class libraries, the recoverable proxy object is a subclass of SOMDClientProxy and DSOM is the communications mechanism. A subclass (or child class) inherits all attributes and methods from its superclass (or parent class). SOMDClientProxy is an object class predefined as part of DSOM. Further preferably, the proxy register object is a SOM object with a metaclass of SOMMSingleInstance. This means that the proxy register object is a member of a class where the class itself is derived from the metaclass SOMMSingleInstance. This metaclass ensures that only a single instance of each class derived from it is created. Requests to create further instances of a class derived in this way simply return pointers to the already created instance.

The invention also provides a distributed object-oriented computer system having one or more proxy objects, the system comprising a server address space and a client address space. The server address space has, located within the address space, a target object on which operations may be performed by client applications, an object request broker for allowing communication with client applications in a client address space, and a server object for responding to requests from client applications. The client address space has, located within the address space, a client application for operating on one or more objects located in the client address space, an object request broker for allowing communication with objects in a server address space, one or more proxy objects, each proxy object containing a pointer to the location within the server address space of the target object.

The system is characterised in that each of the one or more proxy objects further comprises the name of the target object located in a server address space, an alternate pointer to a target object, and a validity flag, the validity flag indicating whether the pointer within the proxy or the alternate pointer should be used to reference the target object. The client address space further comprises a proxy register object which maintains referencing pointers to proxy objects located in client address space and means for updating the one or more proxy objects after a malfunction in the server address space.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Suitable Hardware in Which the Invention may be Implemented

The invention may be run on a variety of computers or collection of computers under a number of different operating systems. The computer could be, for example, a personal computer, a mini computer, mainframe computer or a computer running in a distributed network of other computers. Although the specific choice of computer is limited only by memory and disk storage requirements, computers in the IBM PS/2 series of computers could be used in the present invention (IBM is a registered trademark and PS/2 is a trademark of IBM corporation). For additional information on IBM's PS/2 series of computers, the reader is referred to Technical Reference Manual Personal Systems/2 (Model 80) IBM Corporation Part No. 68X 2256 Order Number S68X-2254. One operating system which an IBM PS/2 personal computer may run is IBM's OS/2 2.0, for more information on the IBM OS/2 2.0 Operating System the reader is referred to OS/2 2.0 Technical Library, Programming Guide Vol. 1, 2, 3 Version 2.00 Order Nos. 10G6261, 10G6495, 10G6494 (OS/2 is a trademark of IBM Corporation).

In the alternative, the computer system might be in the IBM RISC System/6000 line of computers which run on the AIX operating system (RISC System/6000 and AIX are trademarks of IBM Corporation). The various models of the RISC System/6000 are described in many publications of the IBM Corporation for example, RISC System/6000, 7073 and 7016 POWERstation and POWERserver Hardware Technical Reference, Order No. SA23-2644-00 (POWERstation and POWERserver are trademarks of IBM Corporation). The AIX operating system is described in General Concepts and Procedure—AIX Version 3 for RISC System/6000 Order No. SC23-2202-00 as well as other publications of the IBM Corporation.

Figure 3:
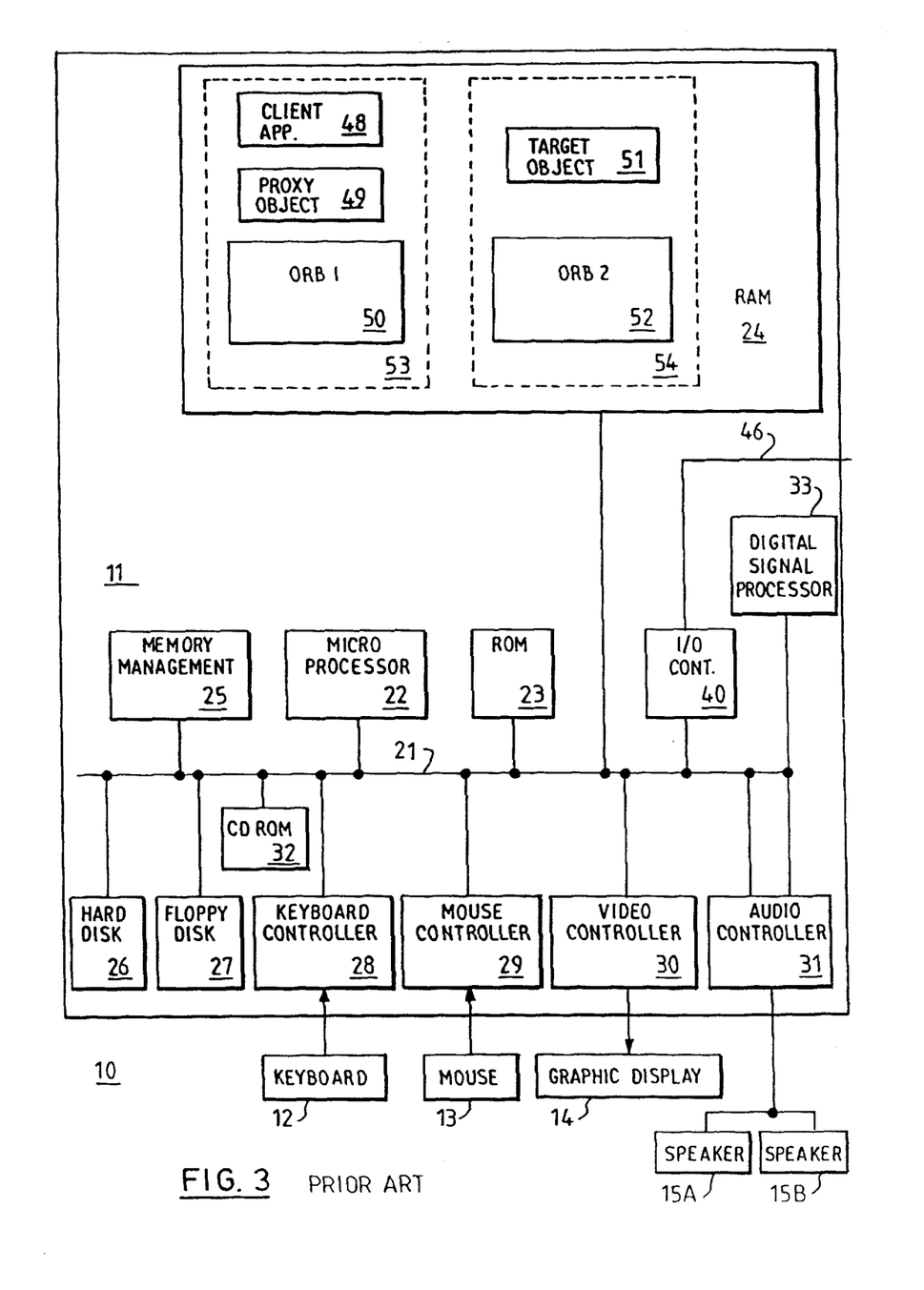
FIG. 3 is a prior art computer system suitable for use with the present invention.

In FIG. 3, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 23 contains among other code the Basic Input-Output System (BIOS) which controls basic hardware operations. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, for example, a multimedia program or presentation.

Also connected to this system bus 21 are various I/O controllers, the keyboard controller 28, the mouse controller 29, the video controller 30, and the audio controller 31. As might be expected, the keyboard controller 28 provides the hardware interface for the keyboard 12, the mouse controller 29 provides the hardware interface for the mouse 13, the video controller 30 is the hardware interface for the display 14, and the audio controller 31 is the hardware interface for the speakers 15a and 15b. An I/O controller 40 such as a Token Ring Adapter enables communication over a network 46 to other similarly configured data processing systems.

One of the preferred implementations of the invention is as a set of instructions 48–52 resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. The memory address spaces coupled together by means of the ORBs can be resident in separate systems communicating over the network 46 or can be two or more address spaces 53, 54 in the memory of a single computer system as depicted in FIG. 3.

Elements of the Present Invention

The present invention overcomes the problems of the prior art client/server environment described earlier by providing recoverable proxy objects, so that instead of replacing all of the pointers in the client application to the old proxy objects located in the client, with new pointers to new proxy objects located in the client, each of the proxy objects in the client is asked to re-validate itself. Such re-validation does not require any client application specific knowledge or code. Recoverable proxy objects register themselves with a "proxy register" object, located in the client, which maintains pointers to all the proxy objects which point to objects in remote servers. Recoverable proxy objects contain three attributes which are not present in non-recoverable proxy objects. These attributes are the "name" of the target object to which it points, a flag which indicates whether or not the proxy object points to a valid object and a pointer to an alternate proxy.

A proxy register object used as part of the present invention will be described with reference to FIG. 4 and Example 1. A proxy object used as part of the present invention will then be described with reference to FIGS. 5, 6 and Example 2. Initialisation of such a proxy object will then be described with reference to FIG. 7.

A first embodiment of the present invention, operating asynchronously and incorporating a proxy register object and a proxy object, is described with reference to FIG. 8. A second embodiment, operating synchronously, is then described with reference to FIG. 9. Prior art dispatching of a method call by a DSOM proxy object to a remote server is then described with reference to Example 3. Dispatching of a method call by a DSOM proxy to a remote server according to the present invention is then described with reference to Example 4.

Proxy Register Object

Figure 4:
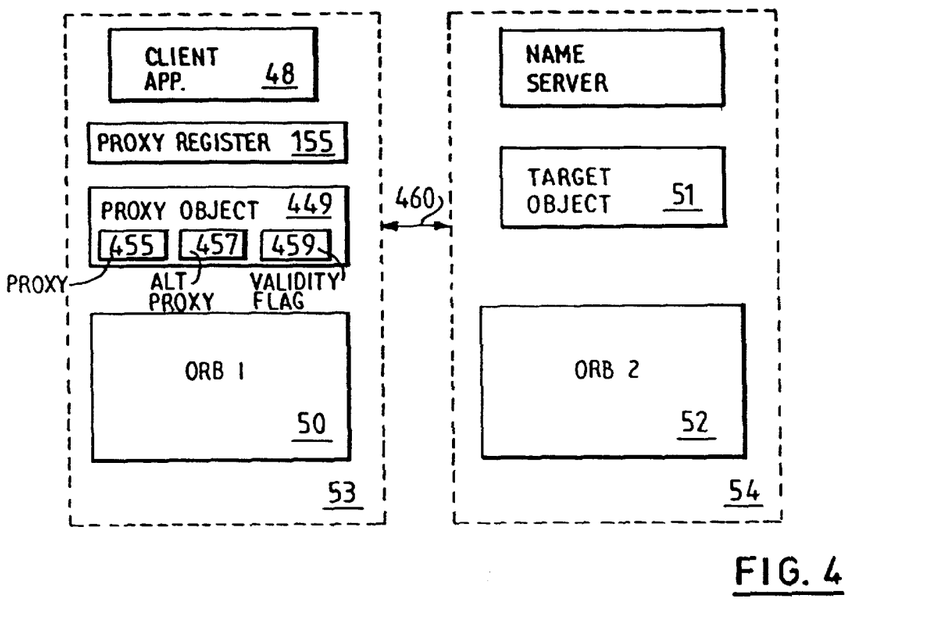
FIG. 4 shows a proxy object and a proxy register object according to the present invention, located in the client/server environment of FIG. 1.

FIG. 4 shows a client address space 53 and a server address space 54, having a known client application 48, a known target object 51 and a known ORB 50, 52. Optionally, there may be a bi-directional communications link 460 between the client address space 53 and the server address space 54. In the absence of such a link 460, the server is unable to send a request to the client application 48. A name server 317 is provided, whose function is to provide a memory address given an object name. Also shown in FIG. 4 is a proxy register object 155 used in the present invention. The proxy register object 155 receives requests from recoverable proxy objects 449 to register themselves when the recoverable proxy objects 449 are created. The proxy register object 155 also receives requests (520 in FIG. 8) when the client application 48 wishes to have the proxy objects 449 refreshed. In any one client address space 53 there is only one single proxy register object 155. This is achieved by use of the SOMMSingleInstance metaclass in SOM. This metaclass ensures that only a single instance of each class derived from it is created. Requests to create further instances of a class derived in this way simply return pointers to the already created instance.

There are three methods which can be performed on the proxy register object.

1. Refresh all of the proxy objects for a given server name. This is used by a client after a client becomes aware that the given server has restarted and proxy object references to locations in that server may be invalid.
2. Add a proxy object to the list maintained by the proxy register object. This is used by a proxy object after it is created in order to ensure that the proxy object is asked to refresh itself in the event of restart of the server in which the target object which this proxy object points to is located.

3. Remove a proxy object from the list maintained by the proxy register object. This is used when a proxy object is destroyed and there is no longer any requirement for it to be refreshed.

Example 1 shows a sample declaration of a proxy register object. The declaration is in IDL (mentioned earlier with reference to CORBA) and defines the interfaces that the object exposes. In IDL, "//" means that the text which follows is a comment. "void" has the same meaning as in the C language, that is to define something that does not return any values.

---
Example 1 - Sample Declaration of Proxy Register Object

```
interface ProxyRegister
{
// These are the methods provided by the proxy register
object
     void refreshProxiesForServer(in string server_name);
     // refresh all proxy objects for the given server
(method 1 in list
     // above)
     void registerProxy(in string server_name,
                                 in CustomProxy proxy);
     // add a proxy object to the list maintained by the
proxy register
     // object (method 2 in list above)
     void unregisterProxy(in string server_name,
                                 in CustomProxy proxy);
     // remove a proxy object from list maintained by the
proxy register
     // object (method 3 in list above)
     #ifdef ___PRIVATE___
     // declare private structure to maintain list of proxy
objects indexed
     // by server name here...
     #endif
     implementation
{
     metaclass = SOMMSingleInstance;
     // There is only one proxy register object in a given
client
     };
};
End of Example 1
```
---

Proxy Object

Figure 5:
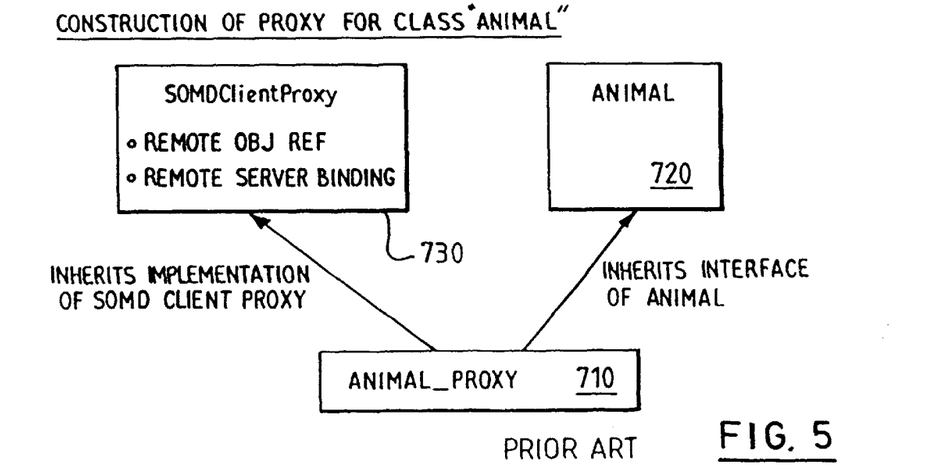
FIG. 5 shows the construction of a prior art proxy object used in the client/server environment of FIG. 1.

FIG. 5 shows the construction of a prior art proxy class for a class Animal. DSOM, and in particular SOMD_ObjectMgr, in conjunction with the DSOM run time modules creates a proxy class called Animal_Proxy 710. The proxy class of Animal_Proxy 710 inherits the interface of the class Animal 720 and the implementation of SOMDClientProxy 730. The attributes for the implementation include the remote object reference, which is the memory location where the remote object is located, and the remote server binding. The Animal_Proxy class 710 retains the methods of the class Animal 720 to provide dispatching of a method call to a remote server in the default manner of DSOM. More information can be found on pp.74–75 of "SOMobjects: A Practical Introduction to SOM and DSOM" mentioned earlier. Dispatching in the default manner of DSOM is described later with reference to Example 3.

Figure 6:
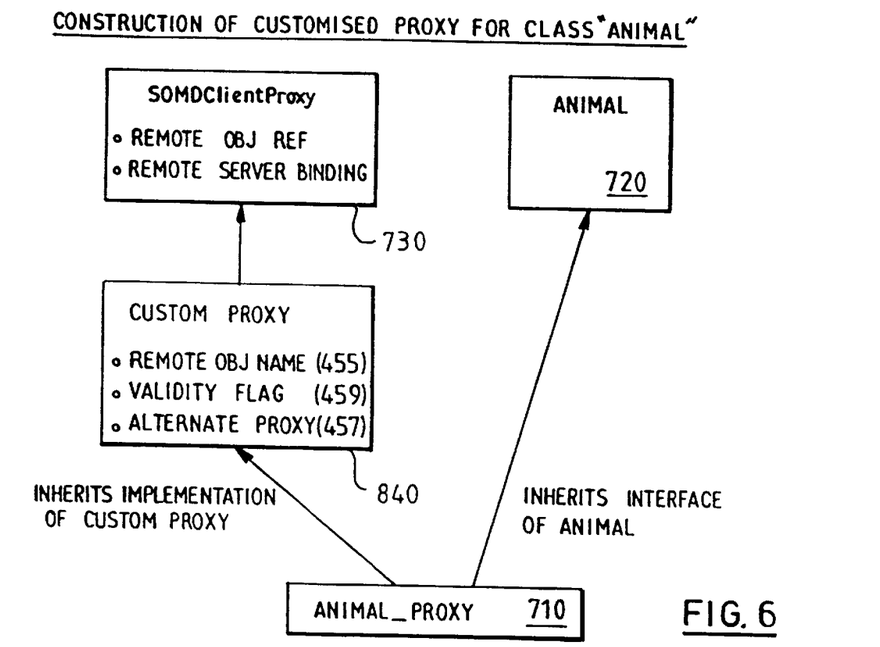
FIG. 6 shows the construction of a proxy object according to the present invention, for use in the client/server environment of FIGS. 8 and 9.

FIG. 6 shows the construction of a proxy class according to the present invention for a class Animal 720. The Animal_Proxy object is supplied by the class library provider, that is, the author of the server objects. The proxy class of Animal_Proxy 710 inherits the interface of the class Animal 720 and the implementation of Custom_Proxy 840. This in turn inherits the implementation of SOMDClient-Proxy 730. The attributes of the Custom_Proxy 840 implementation add a remote object name 455, a validity flag 459 and an alternate proxy 457 to the attributes of SOMClient-Server 730 which it inherited. The Animal_Proxy class 710 overrides the methods of Animal 720 to perform custom dispatching of a method call to a remote server. Dispatching in this custom manner is described later with reference to Example 4.

The attributes which are added by the inheritance of the implementation of Custom_Proxy differentiate a proxy object according to the present invention from a prior art proxy object. The remote object name 455 is the name of the object (51 in FIG. 4) which the proxy object 449 points to in the remote server. The validity flag 459 indicates whether this proxy is valid or whether the alternate proxy 457 should be used. The alternate proxy 457 contains a pointer to the relocated target object to use if the validity flag 459 indicates that the proxy itself is invalid.

Example 2 shows a sample declaration of the Custom_Proxy class. Proxy objects according to the present invention are all derived from this class.

---
Example 2 - Sample Declaration of Custom Proxy class

```
interface CustomProxy : SOMDClientProxy
// This is the definition of a structure in which to hold
information
// about where the remote object can be found
{
     struct RemoteObjectName {
          string server;
          string obj_name; // This is 455 in figs. 6, 8 and 9
     };
// These are the attributes associated with objects of
this class which
// are created
     readonly attribute RemoteObjectName name;
     // Holds information about the target object pointed to
which is meaningful
     // to the remote name server
     readonly attribute boolean valid;
     // Is this proxy valid, or should the alternate proxy
pointer be used?
     // This is 459 in figs. 6, 4, 8 and 9
     readonly attribute CustomProxy alternate_Proxy;
     // A pointer to the alternate proxy to use if this
proxy is invalid
     // This is 457 in figs. 6, 4, 8 and 9
// These are the methods provided as an addition to
those inherited
// from SOMDClientProxy
     void refresh( );
     // Get a new proxy from the remote name server, and set
the alternate
     // proxy pointer to point to it
     implementation
     {
// These are the methods which override those inherited
from
// SOMDClientProxy
          somDefaultInit : override;
          // override default initialiser to initialise
attributes and
          // register this custom proxy object with the proxy
register object
          somDestruct : override;
          // override destructor to deregister this custom
proxy object from
          // the proxy register object
     };
};
End of Example 2
```
---

Figure 7:
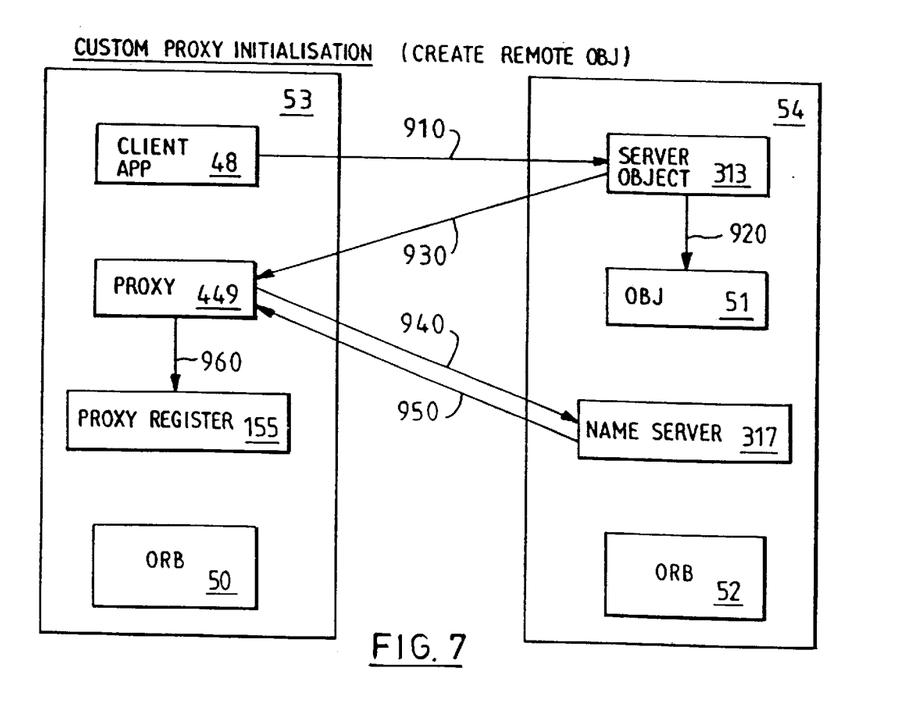
FIG. 7 shows the initialisation of a proxy object constructed according to FIG. 6.

FIG. 7 shows the initialisation of a proxy object constructed according to FIG. 6. The client application 48, proxy object 449, proxy register object 155 and ORB 50 are described earlier with reference to the client address space 53 in FIG. 4. The server 313, target object 51, name server 317 and ORB 52 are also described earlier with reference to the server address space 54 in FIGS. 1 and 2.

Referring to FIG. 7, at step 910, the client application 48 sends a request to create an object to the server 313. The server 313, in response to this request, at step 920, creates an object 51. The server 313, at step 930, returns a proxy object 449 to the client. The proxy object 449, at step 940, contacts the name server 317 in the server address space 54 to get a name (or handle) for the new object 51 created in the server address space 54. The name server 317, at step 950, returns a name, the proxy object 449 stores the name 455 and sets a validity flag 459 to true indicating that the actual proxy should be used rather than the alternate proxy 457. At step 960, the proxy object 449 registers itself with the proxy register object 155.

First Embodiment

Figure 8:
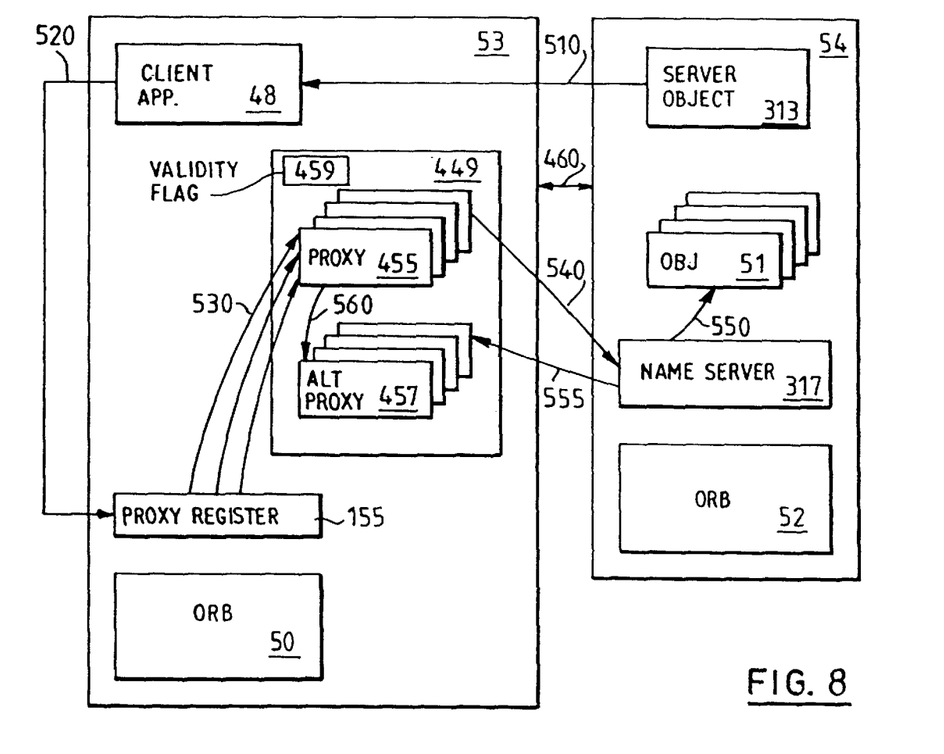
FIG. 8 is a diagram of a client/server environment including a first embodiment of a recoverable proxy object according to the present invention, implemented in a system having a bidirectional link between client and server.

FIG. 8 shows a first embodiment of the invention in which there is a bi-directional link between the server and its clients. When the server restarts after a malfunction, it contacts all of the clients which were connected to it and tells them to refresh their proxy objects. The client application 48, proxy object 449, proxy register object 155 and ORB 50 are described earlier with reference to the client address space 53 in FIG. 4. The server 313, target object 51, name server 317 and ORB 52 are described earlier with reference to the server address space 54 in FIG. 2.

Figure 9:
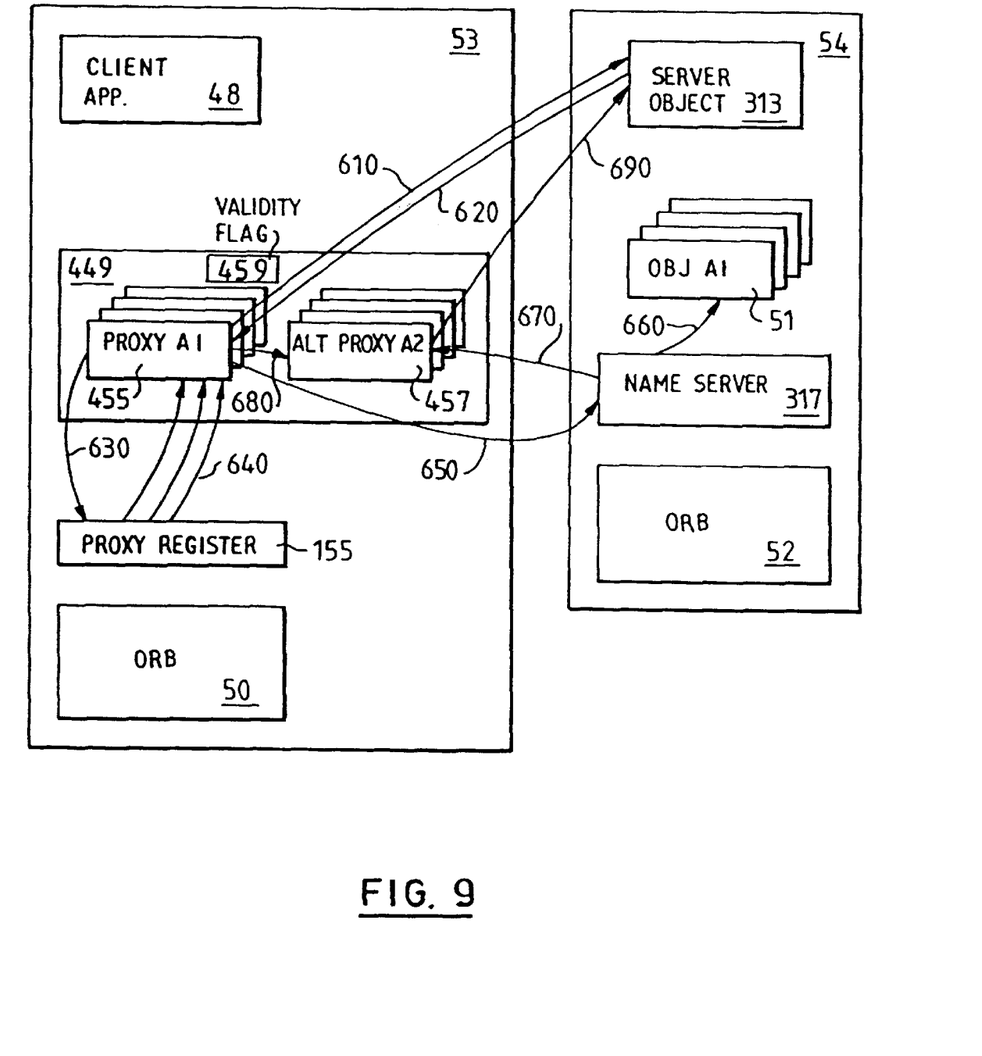
FIG. 9 is a diagram of a client/server environment including a second embodiment of a recoverable proxy object according to the present invention, implemented in a system which does not have a bidirectional link between client and server.

Referring to FIG. 8, at step 510, the server 313 informs each of its client applications 48 that it has restarted following a malfunction. In FIGS. 8 and 9 only a single client application 48 is shown for simplicity, but there may in practice be one or more client applications 48. At step 520, the client application 48 requests the proxy register object 155 to refresh all proxy objects 449 for target objects 51 located in the remote server 54. At step 530, the proxy register object 155 requests all of the proxy objects 449 for target objects 51 located in the server 54 to refresh themselves. At step 540 each proxy object 449 contacts the remote name server 317, passing the remote object name 455 as a parameter, asking for an updated memory location of the remote object 51. At step 550, if the object is a persistent object, the name server 317 locates the target object 51 with the name which was passed to it. If the object is not a persistent object, then the name server 317 creates the object. At step 555, the name server 317 returns the new memory location of the remote object 51 to the proxy object 449 located in the client address space 53. At step 560, the proxy object 449 sets the validity flag 459 to false, updates its alternate proxy pointer 457 to point to the newly supplied memory location of the remote object 51.

Second Embodiment

FIG. 9 shows a second embodiment of the invention in which there is not a bi-directional link between the server and its clients. The clients in this embodiment have to operate a "refresh all proxy objects on first failure" policy. The client application 48, proxy object 449, proxy register object 155 and ORB 50 are described earlier with reference to the client address space 53 in FIG. 4. The server 313, target object 51, name server 317 and ORB 52 are also described earlier with reference to the server address space 54 in FIGS. 1 & 2.

Referring to FIG. 9, at step 610, the proxy object 449 tries to dispatch using the default dispatching method (Example 3) the method call to server 313 using the invalid proxy. This results, at step 620 in the server 313 returning a Bad Object Reference exception. Since, in this embodiment, the clients operate a "refresh all proxy objects on first failure" policy, the proxy object 449 requests, at step 630, the proxy register object 155 to refresh all proxy objects for the remote server 54. At step 640, the proxy register object 155 tells all proxy objects 449 for target objects 51 located in the server 54 to refresh themselves. At step 650, each proxy object 449 contacts the remote name server 317, passing its name as a parameter, to ask for an updated memory location for the target object 51. At step 660, the name server 317 locates (or creates if non-persistent) the object 51 with the given name. At step 670, the name server 317 returns the new proxy to the proxy object 449 located in the client address space 53. At step 680, the proxy sets its validity flag 459 to FALSE, and updates its alternate proxy pointer 457 to point to the newly supplied proxy. At step 690, the proxy object 449 redispatches in a custom manner (Example 4) the original request using its alternate proxy 457.

Further System Malfunctions

If the remote server malfunctions a second time and then restarts, the client does not need a third proxy. It deletes the proxy pointed to by the alternate proxy pointer and replaces that proxy with a new one. The client application will not be aware of any of this. So the client will have no more than two proxies (one invalid and one valid) for each remote object it is accessing. Since clients tend to be more short lived than servers, and the invalid proxies will have disappeared when the client starts up again, the overhead of the additional invalid proxies is not great.

Dispatching

Dispatching is merely the dispatching of a method call by a DSOM proxy object to a remote server. The present invention requires a variation from the default dispatching method in order to determine whether to use the normal proxy or the alternate proxy. Example 3 shows in the IDL langauge the default prior art method of dispatching employed in a prior art DSOM proxy object. The dispatching method is provided by the DSOM framework and inherited by a proxy object on its creation.

Example 3 - Default Dispatch Function Example:

```
string returnString;    //   Define returnString as a "string"
    somId methodId;    //   Define methodId as a "somId"
    // dispatch method to remote server
    methodId = somIdFromString("method1");
    somSelf→somDispatch((void**)&returnString,
                        methodId,
                        somSelf,
                        ev,
                        arg1,
                        arg2);
    SOMFree(methodId);
    return returnString;
}
```
End of Example 3

Example 4 shows in the IDL language the customised method of dispatching employed in a DSOM proxy object implemented according to the present invention. In the dispatching method according to the present invention, the additional step of determining whether to use the normal proxy pointer or the alternate proxy pointer (457) by examination of the validity indication (459) is included. The validity flag (459) is examined, and if it indicates that the normal proxy pointer is valid, then that pointer is used and the method is then dispatched in the same manner as is known in the prior art. If examination of the validity flag (459) indicates that the normal proxy pointer is invalid, then the method is then dispatched in the same manner as is known in the prior art, but using the alternate proxy pointer (457).

In addition, error handling of a Bad Object reference is attempted by causing all of the proxy objects to be updated. Customisation is achieved by modifying the dispatching method provided by the DSOM framework and inherited by a proxy object on its creation.

Example 4 - Customised Dispatch Function Example:

```
{
1   string returnString;   //   Define returnString as a "string"
    somId methodId;   //   Define methodId as a "somId"
    SOMDClientProxy *valid_Proxy;
    // determine whether to use this proxy or the alternate proxy
    if (_valid)
    {
        valid_Proxy = somSelf; // use this proxy
    }
    else
    {
        valid_Proxy = _alternate_Proxy; // use my alternate proxy
    }
    // dispatch method to remote server
    methodId = somIdFromString("method1");
    valid_Proxy→somDispatch((void**)&returnString,
                            methodId,
                            valid_Proxy,
                            ev,
                            arg1,
                            arg2);
    SOMFree(methodId);
    // Now check for a BadObject reference error, which may be caused by
    // a server malfunction and recovery
    if ( (ev→_major == SYSTEM_EXCEPTION) &&
         (ev→_minor == SOMDERROR_BadObjref) )
    {
        // This is a proxy failure we can attempt to deal with, using
        // the present invention
        // first clear the exception from the environment
        somdExceptionFree(ev);
        // now cause all proxy objects to be updated
        ProxyRegister *register;
        register = (ProxyRegister*) _ProxyRegister→sommGetSingleInstance(ev);
        register→refreshProxiesForServer(_name.server);
        // I will have been updated, so retry the dispatch
        returnString = somSelf→method1(ev, arg1, arg2);
```

What is claimed is:

1. A method of distributed object-oriented computing in which a recoverable proxy object, located in a client address space has a pointer to a target object in a server address space, the method comprising the steps of:

storing, in said proxy object, the name of the target object, an indication as to the validity of the proxy object and an alternate proxy to said target object;

said proxy object registering itself with a proxy register object, said proxy register object maintaining a referencing pointer to said proxy object;

said proxy object checking the validity of the proxy object, prior to each invocation of said target object;

responsive to said checking, using the proxy object if valid, or the alternate proxy if not valid; and responsive to a malfunction in said server address space:

said proxy register object causing each of said proxy objects to obtain a valid alternate proxy to target objects in said server, to indicate that said proxy object is invalid and to store a pointer to the valid alternate proxy.

2. A method as claimed in claim 1 wherein:

said server address space and said client address space are linked by a bi-directional communications link; and said server object requests said client application to cause each of said proxy objects to refresh by obtaining a valid alternate proxy to target objects located in said server address space.

3. A method as claimed in claim 2 wherein said step of refreshing proxy objects further comprises creating, by means of said server object in response to said client application, the target object if it was not a persistent object.

4. A method as claimed in claim 1 wherein said client application causes each of said proxy objects to refresh by obtaining a valid alternate proxy to target objects located in said server address space on receipt of an error indication in accessing a target object located in said server address space.

5. A method as claimed in claim 4 wherein said step of refreshing proxy objects further comprises creating, by means of said server object in response to said client application, the target object if it was not a persistent object.

6. A method as claimed in claim 1 wherein said distributed object-oriented system is a CORBA compliant system.

7. A method as claimed in claim 6 wherein said distributed object-oriented computer system uses DSOM class libraries.

8. A method as claimed in claim 7 wherein said recoverable proxy object is a subclass of SOMDClientProxy and DSOM is the communications mechanism.

9. A method as claimed in claim 7 wherein said proxy register object is a SOM object with a metaclass of SOMMSingleInstance.

10. A distributed object-oriented computer system having one or more proxy objects, the system comprising:

a server address space, having located within the address space:

a target object on which operations may be performed by client applications;

an object request broker for allowing communication with client applications in a client address space; and a server object for responding to requests from client applications;

a client address space, having located within the address space;

a client application for operating on one or more objects located in the client address space;

an object request broker for allowing communication with objects in a server address space;

one or more proxy objects, each proxy object containing a pointer to the location within the server address space of the target object;

wherein:

each of said one or more proxy objects further comprises:

the name of the target object located in a server address space;

an alternate pointer to a target object;

a validity flag, the validity flag indicating whether the pointer within the proxy or the alternate pointer should be used to reference the target object; and said client address space further comprises:

a proxy register object which maintains referencing pointers to proxy objects located in the client address space; and means for updating said one or more proxy objects after a malfunction in the server address space.

11. A method of distributed object-oriented computing in which proxy objects in a client address space have a primary pointer to target objects in a server address space so that calls on the proxy object result in invocation of the corresponding target objects, the method comprising the steps of:

in response to malfunction in the server address space potentially causing relocation of said target objects;

recovering said proxy objects to point to the relocated target objects;

the method being characterized by the further steps of:

causing each of said proxy objects to obtain from a name server in said address space and to store a valid alternate pointer to said relocated target objects;

creating a validity flag in said proxy object indicating that said primary pointer is invalid and said alternate pointer should be used whereby a call on the proxy object will result in invocation of the relevant target object.

12. A system as claimed in claim 11 wherein said server address space and said client address space are linked by a bi-directional communication link and said server object requests said client address space to cause each of said proxy objects to refresh by obtaining a valid alternate proxy to target objects located in said server address space.

13. A system as claimed in claim 10 wherein said client application causes each of said proxy objects to refresh by obtaining a valid alternate proxy to target objects in said server address space on receipt of an error indication in accessing a target object located in said server address space.

14. A system as claimed in claim 11 wherein said system is a CORBA compliant system.

15. A computer program product on a computer readable memory for distributed object-oriented computing in which a recoverable proxy object, located in a client address space has a pointer to a target object in a server address space, the computer program product comprising:

means for storing, in said proxy object, the name of the target object, an indication as to the validity of the proxy object and an alternate proxy to said target object;

means for said proxy object registering itself with a proxy register object, said proxy register object maintaining a referencing pointer to said proxy object;

means for said proxy object checking the validity of the proxy object, prior to each invocation of said target object;

means responsive to said checking, using the proxy object if valid, or the alternate proxy if not valid; and means responsive to a malfunction in said server address space for causing said proxy register object to cause each of said proxy objects to obtain a valid alternate proxy to target objects in said server, to indicate that said proxy object is invalid and to store a pointer to the valid alternate proxy.

16. A computer program product on a computer readable memory for distributed object-oriented computing in which proxy objects in a client address space have a primary pointer to target objects in a server address space so that calls on the proxy object result in invocation of the corresponding target objects, the computer program product comprising:

in response to a malfunction in the server address space potentially causing relocation of said target objects;

means for recovering said proxy objects to point to the relocated target objects;

means for causing each of said proxy objects to obtain from a name server in said address space and to store a valid alternate pointer to said relocated target objects;

means for creating a validity flag in said proxy object indicating that said primary pointer is invalid and said alternate pointer should be used whereby a call on the proxy object will result in invocation of the relevant target object.

* * * * *

UNITED STATES PATENT AND TRADEMARK OFFICE
CERTIFICATE OF CORRECTION

PATENT NO. : 5,903,725
DATED : May 11, 1999
INVENTOR(S) : Colyer

It is certified that error appears in the above-identified patent and that said Letters Patent is hereby corrected as shown below:

Column 15, line 44, after "arg2);" go to next line and continue Example 4 by inserting --}

```
    return returnString;
}  --;
```
End of Example 4

Although a specific embodiment has been disclosed, it will be understood by those skilled in the art that changes can be made to this specific embodiment without departing from the spirit and scope of the invention. Furthermore, this embodiment is for the purpose of example and illustration only and is not to be taken to limit the scope of the invention or narrow the scope of the appended claims.--.

Signed and Sealed this

Eighteenth Day of April, 2000

Attest:

Q. TODD DICKINSON

*Attesting Officer*    *Director of Patents and Trademarks*